United States Patent
Farchi et al.

(10) Patent No.: US 7,512,618 B2
(45) Date of Patent: Mar. 31, 2009

(54) AUTOMATIC INSPECTION TOOL

(75) Inventors: Eitan Farchi, Pardes Hanna-Carcur (IL); George Inness, Cary, NC (US); Shmuel Ur, Misgav (IL)

(73) Assignee: International Business Machines Corporation, Armonk, NY (US)

( * ) Notice: Subject to any disclaimer, the term of this patent is extended or adjusted under 35 U.S.C. 154(b) by 657 days.

(21) Appl. No.: 11/042,390

(22) Filed: Jan. 24, 2005

(65) Prior Publication Data

US 2006/0167866 A1    Jul. 27, 2006

(51) Int. Cl.
*G06F 17/30* (2006.01)
(52) U.S. Cl. .............. 707/101; 707/104.1; 702/182
(58) Field of Classification Search ........... 707/101, 707/104.1; 702/182
See application file for complete search history.

(56) References Cited

U.S. PATENT DOCUMENTS

| | | | |
|---|---|---|---|
| 6,885,977 B2 * | 4/2005 | Gavra et al. ............ 702/185 |
| 7,039,256 B2 * | 5/2006 | Zlotnick et al. ........ 382/311 |
| 7,337,124 B2 * | 2/2008 | Corral ..................... 705/9 |
| 7,386,831 B2 * | 6/2008 | Flanagan ................ 717/103 |
| 7,403,915 B2 * | 7/2008 | Bundy et al. ........... 705/27 |
| 2003/0163323 A1 * | 8/2003 | Bluvband ............... 704/275 |
| 2004/0010444 A1 * | 1/2004 | Delorme et al. ........ 705/11 |
| 2004/0088324 A1 * | 5/2004 | Khan et al. ............ 707/104.1 |
| 2005/0216564 A1 * | 9/2005 | Myers et al. ........... 709/206 |

* cited by examiner

*Primary Examiner*—Leslie Wong

(57) ABSTRACT

A system and method for an automatic inspection tool is provided including an inspection engine to analyze an input and to generate at least one comment block and a display engine to display the at least one comment block in the context of the input. The at least one comment block includes any of a correct paraphrasing, an incorrect paraphrasing, a suggestion, and a question. The input may include code a circuit design, a technical document, and text in a natural language.

6 Claims, 4 Drawing Sheets

AUTOMATIC INSPECTION TOOL

FIELD OF THE INVENTION

The present invention relates to automatic inspection tools in general.

BACKGROUND OF THE INVENTION

In many fields, error prevention enables a huge cost savings over error correction and early detection of errors in general leads to easier correction. For example, in writing software and firmware code it is much harder to correct defects late in the programming cycle as opposed to defect prevention through code inspections and testing. Another example field is circuit design, in which correction of design and production problems is problematic and costly. Related examples of fields in which error detection is necessary are the teaching of natural languages (e.g. French, English) and technical writing.

Tools exist for testing circuit designs; however generally each tool operates independently. Though automatic grammar checkers exist for natural languages, they are limited in scope. Hence, technical documents generally are also reviewed by editors.

Much research has been done to increase awareness of typical coding errors and to develop systematic methods to find and correct them. Defect classification research focuses on the identification of patterns of errors. There exist many known patterns typical of software code, for example, sort algorithms. These similar code patterns may lead to similar types of coding errors, also known as anti-patterns. Another type of error is "mutation", common errors that include misuse of operators, operands and the like. For example, misuse of the operators "=" and "==" may lead to errors since the statement "if (a=b)" will produce different results than "if (a==b)". Likewise, for example, confusing "<" with ">", or "<" with "<=", are common errors. Other examples of mutation include miscoding of loop endpoints, for example, using "1<i<10" instead of "0<i<9". An example of an anti-pattern is putting the loop test condition outside the loop, hence loosing control of the test condition. Other types of errors may relate to style, for example, the placement of brackets around code blocks.

Code inspection to find errors in software code is now an integral part of software development and testing. When performed manually, a different area of responsibility may be given to each participant, for example, synchronization, style, or security. They review the code looking for errors of that specific type. To aid in this task, there are computer programs available that look for known error types and produce a report of errors (or warnings). Different programs look for different types of errors, for example, mutation errors, anti-patterns, or static analysis. Generally, a code inspection will include a meeting between the code reviewers and the code author during which errors, including any found by a computer program will be reviewed, evaluated, and if necessary corrected. A common method used during manual code inspection is paraphrasing. As the code is inspected, the reviewer may paraphrase parts to ascertain what the programmer meant to write. Code inspection is a tedious task that is only as good as the effort put into finding the errors.

SUMMARY OF THE INVENTION

Applicants have created a system and method for automatic inspection. Automatic inspection tools of the present invention, may be used to find errors, may show perceived errors in context, may be used to keep a record of errors, and may show concepts or areas in which the writer or designer lacks understanding. In an embodiment of the present invention, incorrect paraphrasing may be included, which may be used to check that the input is being inspected carefully and that the reviewer is not accepting all suggestions without thinking. An embodiment of the present invention may comprise the results of at least one other inspection tool, which may be organized in a different manner. The system and method of the present invention may be used, for example, in the development of software and firmware code (hereinbelow code), circuit design, the teaching of natural languages, and technical writing.

The automatic inspection tools of the present invention may be further used to comment on code and may cause the programmer to think about program segments in a different way, for example, due to paraphrasing. Use of an embodiment of the present invention may provide an alternative to code inspection teams, which are generally comprised of several members each of whom is responsible for a different type of error.

There is provided in accordance with an embodiment of the present invention, a method for automatic inspection. The method may include generating a remark block on analyzed input, and showing the remark block in the context of the input. The generating may include any of correct paraphrasing, incorrect paraphrasing, suggesting, and questioning.

There is further provided in accordance with an embodiment of the present invention, a system for automatic inspection. The system may include an inspection engine to analyze an input and to generate at least at least one comment block, and a display engine to display the at least one comment block in the context of the input. The at least one comment block may include any of a correct paraphrasing, an incorrect paraphrasing, a suggestion, and a question.

There is further provided in accordance with an embodiment of the present invention, a method for automatic inspection. The method may include receiving statistics on remark blocks in historical analyzed input, calculating statistics on remark blocks for current analyzed input, comparing the number of remark blocks in historical input to the number of remark blocks in the current input, checking the number of remark blocks of the current input accepted, and generating a report.

There is further provided in accordance with an embodiment of the present invention, a report generation method. The method may include receiving statistics on remark blocks in historical analyzed input, calculating statistics on remark blocks for current analyzed input, comparing the statistics on historical input to the statistics on current input, and reporting on at least one knowledge deficiency area.

There is further provided in accordance with an embodiment of the present invention, an automatic inspection tool system. The system may include a first receiver to receive a set of statistics on remark blocks of historical analyzed input, a second receiver to receive a set of statistics on remark blocks of current analyzed input, a comparator to compare the sets of statistics received, and a report generator to output comparison results.

There is further provided in accordance with an embodiment of the present invention, an article including a storage medium having stored thereon instructions that, when executed by a computing platform, result in generating a remark block on analyzed input, and showing the remark block in the context of the input. The generating may include any of correct paraphrasing, incorrect paraphrasing, suggesting, and questioning.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings, in which:

Figure 1A:
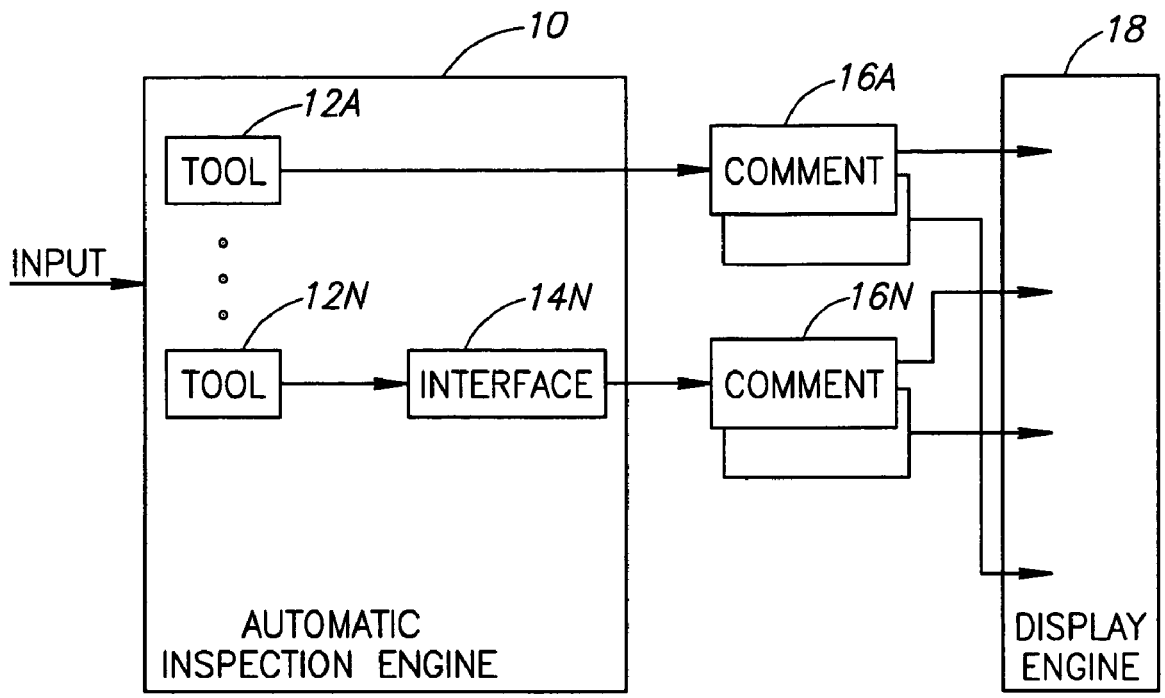
FIG. 1A is a block diagram illustration of an automatic inspection system, in accordance with an embodiment of the present invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, and components have not been described in detail so as not to obscure the present invention.

Unless specifically stated otherwise, as apparent from the following discussions, it is appreciated that, throughout the specification, discussions utilizing terms, such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In parts of the description hereinbelow, examples from the field of code inspection are used. In these cases, code inspection is used as a non-limiting descriptive example. This is done for clarity purposes only, to make the description easier to understand.

Reference is now made to FIG. 1A, a block diagram illustration of an automatic inspection system, in accordance with an embodiment of the present invention, comprising an automatic inspection engine 10, at least one comment block 16, and a display engine 18. Automatic inspection engine 10 may receive input. At least one comment block 16 may be generated by automatic inspection engine 10. Comment block(s) 16 may be displayed together with the appropriate section of input by display engine 18.

Automatic inspection engine 10 may comprise at least one inspection tool 12. Inspection tool 12 may perform at least one type of inspection. In a non-limiting example, in the case of code inspection, possible inspection types may comprise, security, efficiency, compliance to standards, style, mutation errors, anti-pattern errors, etc.

In an embodiment of the present invention, inspection tool 12 may comprise a specially created inspection tool, which may be integrated into automatic inspection engine 10. In an embodiment of the present invention, inspection tool 12 may comprise any tool known in the art that may be incorporated for use by automatic inspection engine 10. Exemplary inspection tools 12 performing static analysis may include JTest® (available from Parasoft, Monrovia, Calif., USA) and Java Lint (available from http://artho.com/jlint/). Exemplary inspection tools 12 performing mutation coverage may include CodeWizard (also available from Parasoft), and Generic Coverage Tool (available from ftp://cs.uiuc.edu/pub/misc/testing/gct.1.4/, Testing Foundations, Champaign, Ill., USA). Automatic inspection engine 10 may automatically generate comment block(s) 16, which may be based on knowledge of the input domain. The results may be in any programming language or natural language as appropriate. In a further embodiment of the present invention, the user may choose whether the same language as the input or a different language should be used.

Inspection tool 12 may generate comments that are output directly to comment block(s) 16 as shown by inspection tool 12A and comment block 16A. Inspection tool 12 may send its output to an appropriate interface 14 that may create comment block(s) 16, as shown by inspection tool 12N, interface 14N, and comment block 16N. In a non-limiting example, interface 14 may format the output of a commercially available inspection tool into comment block(s) 16 in a format compatible with the particular embodiment of the present invention. Furthermore, interface 14 may organize the output in a different manner. Comment block(s) 16 are described in detail hereinbelow with respect to FIG. 1B.

As the input is inspected by a user line-by-line, display engine 18 may display comment block(s) 16, relating to the particular line(s) of input, and hence comment block(s) 16 may be reviewed in the context of the input to which they relate. Comment block(s) 16 may address different inspection areas. Hence, all comment block(s) 16 relating to a section of input may be displayed one after another, regardless of which inspection tool 12 created them. This may allow a user to discern impacts and/or relationships between different comment blocks 16 pertaining to the same input section.

In a non-limiting example in code inspection, a mutation error may in addition, generate an error relating to security, efficiency, and/or compliance to standards. Display of the relevant comment blocks 16 together may allow a user to determine the "root" error. This may avoid the user being diverted by a "secondary" error. It may further cause the user to think about the program segment from a different perspective.

Various layouts of the output created by display engine 18 are possible and are within the scope of the present invention. For example, the original input may appear in one section of the display with the contents of the appropriate comment block(s) 16 in another section. Alternatively, the input may be interleaved with the appropriate comment block(s) 16.

Figure 1B:
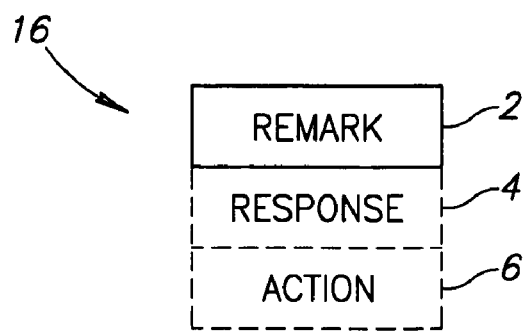
FIG. 1B is a block diagram illustration of a comment block of FIG. 1A, in accordance with an embodiment of the present invention.

Reference is now made to FIG. 1B, a block diagram illustration of comment block 16 (FIG. 1A), in accordance with an embodiment of the present invention. Each comment block 16 may comprise a remark block 2, an optional response block 4, and an optional action block 6. Inspection tool 12 may generate remarks on all appropriate pieces of input, for example, by rewording the input or asking questions about the input.

Each remark block 2 may relate to a single possible error. Remark block 2 contents may comprise any of correct paraphrasing, incorrect paraphrasing, suggestions, and questions. Correct paraphrasing may comprise rewording the input. Incorrect paraphrasing may comprise the inclusion of deliberate mistakes, for example, mutation or bug-pattern defects (in code) or a mismatched subject and verb pair (in natural languages). Mutation coverage tools known in the art may operate by changing the code with a mutation change to see if it affects the test result. The user may not be shown the change in the code. However, when a result is affected, the user may be notified of a mutation error. In an embodiment of the present invention, incorrect paraphrasing may be generated by creating a mutation error where one did not exist previously. This may be done with natural languages as well, purposefully adding spelling or grammar errors or in technical documents by adding bogus fields or options. Incorrect paraphrasing may enable an evaluation of how carefully the inspection is being done, for example, by counting the number of instances of incorrect paraphrasing which were found and/or not found. Although acceptance of an instance of incorrect paraphrasing may not actually be incorporated into the program, a notification that the inspection has not been accepted may be generated. Furthermore, the inclusion of an obvious error, for example, in a report may ensure that the inspector is not simply accepting all suggestions but rather is considering each one.

Suggestions for improvements may comprise, in a non-limiting example from code inspection, programming "tricks" to improve performance or style. Suggestions may or may not be correct, however, the thought required in determining if the suggestion is correct may increase confidence in the code. For example, changing the code "while(c) wait( )" to "while (c) sleep(duration)" may be suggested in order to simplify the code, since then notifications may no longer be needed in other places of the code. Other suggestion examples may include: 1) that class variables be accessed directly instead of through a method (to improve performance), 2) the addition, removal, or a change in the scope of a synchronization lock, and 3) setting a global variable to null when current usage is complete. In the field of natural languages, suggestions may be made, for example, relating to style, sentence complexity, or paragraph length. Suggestions may be generated, for example, from warnings produced by inspection tool(s) 12.

In a non-limiting example from the field of code inspection, remarks may comprise questions about the program using, for example, relevant information that may have been obtained from program understanding tools. Questions may further be asked for which the system does not know the result. Given a reply to a question, an assertion may be created, which will check that the reply is correct. For example, given the input code "if (x<y)", automatic inspection engine 10 (FIG. 1A) may paraphrase this into "if (x<=y)" or alternatively may ask if x can be equal to y. If the user replies that x can never be equal to y or that the two are equivalent, an assertion may be made to check during run time that the assertion holds. Replies to questions about a section of code that is not understood may be useful for paraphrasing and/or testing the code and/or may be used for documentation purposes.

Optional response block 4 may comprise a set of alternatives to chose from, a yes/no option, a text input field, or any other appropriate form of entry. A user may input a response to the remarks in remark block 2. Display engine 18 may not continue until a response is given, which may ensure that all input is inspected. In a further embodiment of the present invention, a successful complete review of the input may document that it has been inspected in fill.

Optional action block 6 may be used in situations that indicate that an action is necessary. For example, given the input example above, "if (x<y)", the response given in response block 4 may cause the generation of a run time assertion. Further examples of remark block(s) 2, response block(s) 4, and action block(s) 6 are given with respect to a code example hereinbelow.

In an embodiment of the present invention, an open architecture may be used, which may allow a user to select from among various options. For example, a user may select from various inspection types such as security, compliance with standards, efficiency, grammar, spelling, etc. Further, the user may select the language used in the comment blocks. An open architecture may further allow other inspection tools to be added easily (e.g., as plug-ins).

In an embodiment of the present invention, the generated remarks may be aligned to the type of user. For example, in a natural language a sentence containing more than 20 words may generate a remark. However, if the user is an author, long sentences may not generate remarks. Such alignment may be automatic or user set.

In an embodiment of the present invention, a confidence level for generating a comment may be defined reflecting assumptions about the user, for example, his/her proficiency level. The confidence level may be user set or may be set and/or changed automatically. For example, if the user always agrees with the generated remarks, the confidence level may be automatically lowered, which may generate a greater number of comments. However if the user always disagrees with the comments, the confidence level may be raised, which may limit the number of comments generated.

Figure 2:
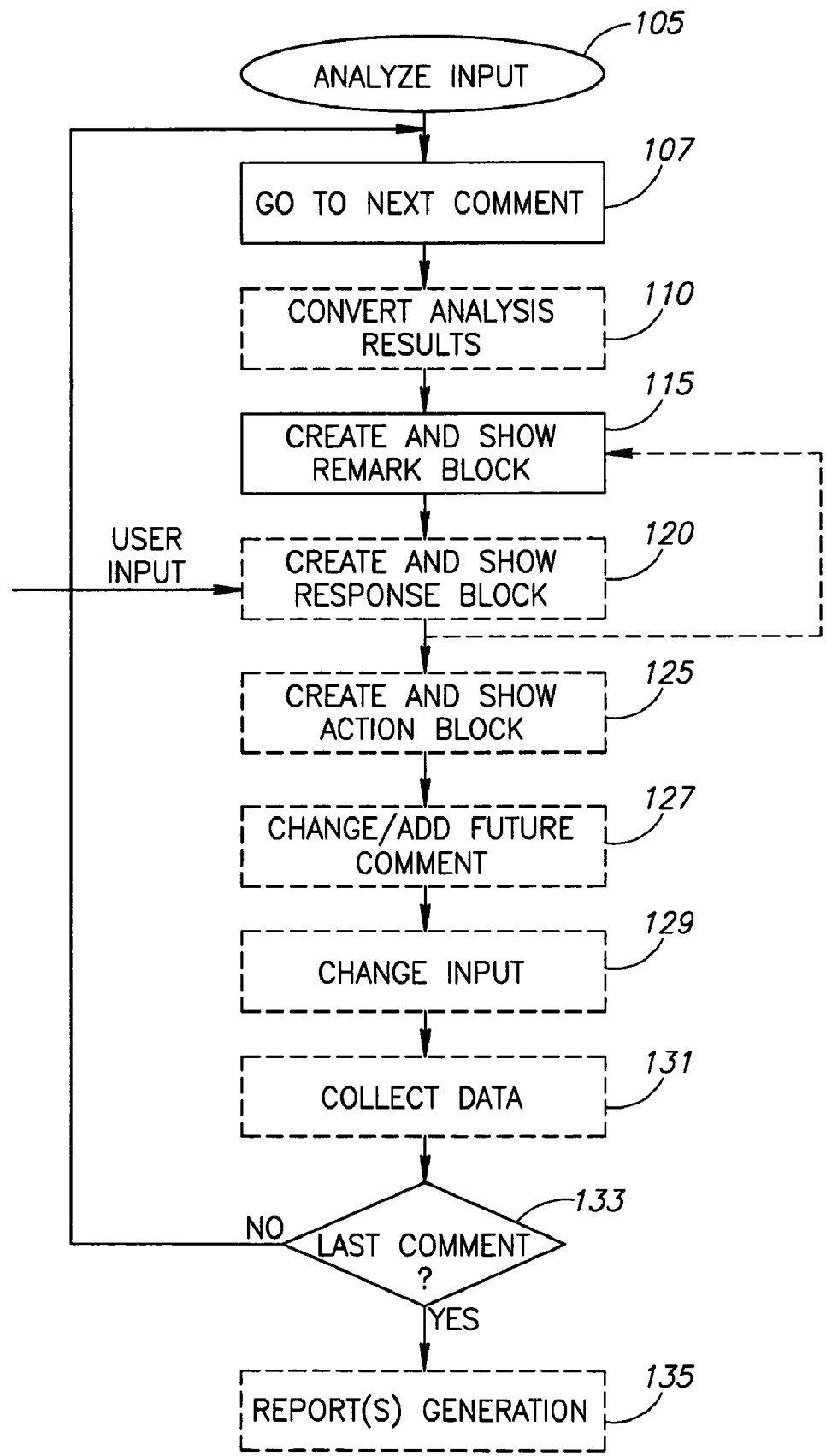
FIG. 2 is a flow chart illustration of a method of automatic inspection, in accordance with an embodiment of the present invention.

Reference is now made to FIG. 2, a flow chart illustration of a method of automatic inspection, in accordance with an embodiment of the present invention. Input to automatic inspection engine 10 may be inspected and/or analyzed by various inspection tools (block 105). Comments generated by all inspection tools that were used may be ordered according to some predetermined order. For example, comments related to a program may be ordered according to execution order. Comments may generally be inspected from the first to the last, although in an embodiment of the present invention it may be possible to inspect comments in some other predetermined order. Each comment may be handled in turn in a similar manner, which may begin with finding the next comment (block 107).

Results of inspection tools may optionally be input to an interface to be converted into a format compatible with the particular embodiment of the invention (block 110). Remark block(s) (of comment blocks 16 FIG. 1A) may be created and displayed together with the corresponding original input, which may allow them to be inspected in the context of the relevant input. For example, comments related to program code may comprise an index indicating the relevant code section. Remark block(s) may comprise any of a correct paraphrasing of the input, incorrect paraphrasing of the input, questions about sections of the input not understood, and suggestions for improvements (block 115).

Response block(s) (of comment block(s) 16) may optionally be generated and displayed, and may comprise user response(s) to the remark contained in the corresponding remark block(s) (block 120). In a further embodiment of the present invention user response(s) may be used interactively. Hence, the response may cause a return to the remarks creation process (block 115) and/or may cause an action block to be created. Action block(s) (of comment block(s) 16) may optionally be generated (block 125) and displayed.

User input may cause further action. Comments related to input not yet inspected may be added or changed (block 127). Original input may be changed (block 129). Data may be collected (block 131). A check may be made whether more comments exist (block 133). If the current comment is not the last, blocks 107-133 may be repeated until all the input has been reviewed and all the comments addressed. If the current comment is the last, various reports may optionally be generated (block 135). Embodiments of the generation of exemplary reports will be described hereinbelow with respect to FIGS. 3 and 4.

The following program fragment will be used as a non-limiting example to demonstrate samples of possible generated comments.

```
1.  public class example{
2.      static final int NUM = 5;
3.      static int Global = 0;
4.      public static void main(String[ ] argv){
5.      public static void main(String[ ] argv){
6.          Global = 0;
7.          threads[0] = new Adder(1);
8.          threads[1] = new Adder(10);
9.          threads[2] = new Adder(100);
10.         threads[3] = new Adder(1000);
```

-continued

```
11.         threads[4] = new Adder(10000);
12.         for(int i=0; i<NUM; i++){
13.             threads[i].start( );
14.         }
15.         try{ Thread.sleep(1000); } catch(Exception exc){ }
16.         System.out.println(Global);
17.     }
18. }
19. class Adder extends Thread{
20.     public int Local;
21.     Adder(int i){
22.         Local = i;
23.     }
24.     public void add( ){
25.         example.Global += Local;
26.     }
27.     public void run( ){
28.         add( );
29.     }
30. }
```

An example set of possible resulting comment blocks:

Line 1: Remark Block: Should there be comments here? (example of a question).
    Response Block: Yes/No option. Text input field available if user selects yes.
Line 2: Remark Block: static int NUM = 5; (example of paraphrasing, may reflect the meaning of the code line.
Line 3: Remark Block: int Global = 0; (example of incorrect paraphrasing)
Line 6: Remark Block: given line 3 "static int Global = 0" do you need this statement as well? If so why? (example of a question).
    Response Block: Yes/No option. Text input field available if user selects yes.
    Action Block: Save user text input (if yes) into documentation record.
Lines 7-11: Remark Block: Replace with the following loop
31. for(int i=0; i<NUM; i++){
32.     threads[i] = new Adder(10^i);
33. }
    (example of a suggestion)
    Response Block: Yes/No option.
    Action Block: If yes, replace code and save into documentation record.
Line 12: Remark Block: Should this be "for (int i=1; i<=NUM; i++) {"? (example of a suggestion)
    Response Block: Yes/No option.
    Action Block: If yes, replace code.
Line 15: Remark Block: Remove the sleep or use a synchronization primitive instead (e.g., "wait") to perform notification. (example of a suggestion)
    Response Block: Yes/No option.
Line 25: Remark Block: Warning, this code is not synchronized. Two threads may reach unpredictable results! Choose the desired synchronization method and the code will be changed.
    Response and/or Action Block: Choice of code blocks.

In an embodiment of the present invention, user responses may be saved and used to document input sections. In an embodiment of the present invention, user responses may be used to prove that the input has been reviewed. This may be important, as several standards bodies, for example, ISO (International Organization for Standardization) require documentation of the quality process.

In an embodiment of the present invention, data regarding the errors found in the input may be used in generating various reports. The(se) report(s) may comprise actions to improve input inspection, input design, input development, user learning, and/or user writing. A report on instances of incorrect paraphrasing that were accepted may be an important quality measure and may cause an inspector to think carefully before accepting remarks. In an exemplary implementation of the present invention, an xml document may be created comprising an entry for each error found, which lists the error, error type, and line number. This document may be imported into a spreadsheet or database and may provide data that may be used by a metrics gathering tool to determine the quality of the input. Example metrics may include error rate by type per X lines of input. In a further embodiment of the present invention, error data may be used in orthogonal defect classification (ODC), a defect classification scheme well known in the art.

The following exemplary scenarios of code inspection will be used to help clarify the description hereinbelow with respect to FIGS. 3 and 4. Though lines of code are used, input may comprise code, a design circuit, a technical document, or writing in a natural language, all of which are within the scope of the present invention. An input may comprise 1000 lines of code. Using historical statistics as a metric, 200 remarks may be expected on average per 1000 lines of code.

In scenario A, 100 remarks may have been generated on the current input. This may indicate a case of good programming. Of the 100 remarks generated, 30 may have been accepted. If historical statistics show that on average, 40 remarks are accepted out of 100, this rate of acceptance may be acceptable. Historical statistics may show, however, that on average, only 10 remarks are accepted out of 100. This may indicate a case of bad programming, and a report or flag may be generated.

In scenario B, 600 remarks may have been generated on the 1000 lines of code. As 200 remarks on average may have been expected, this may indicate a basic problem that should be checked out. A report or flag may be generated.

In an embodiment of the present invention, the historical statistics used may reflect a predetermined level of user expertise, for example, novice, average, or expert. In an embodiment of the present invention, the user may chose the level used.

Figure 3:
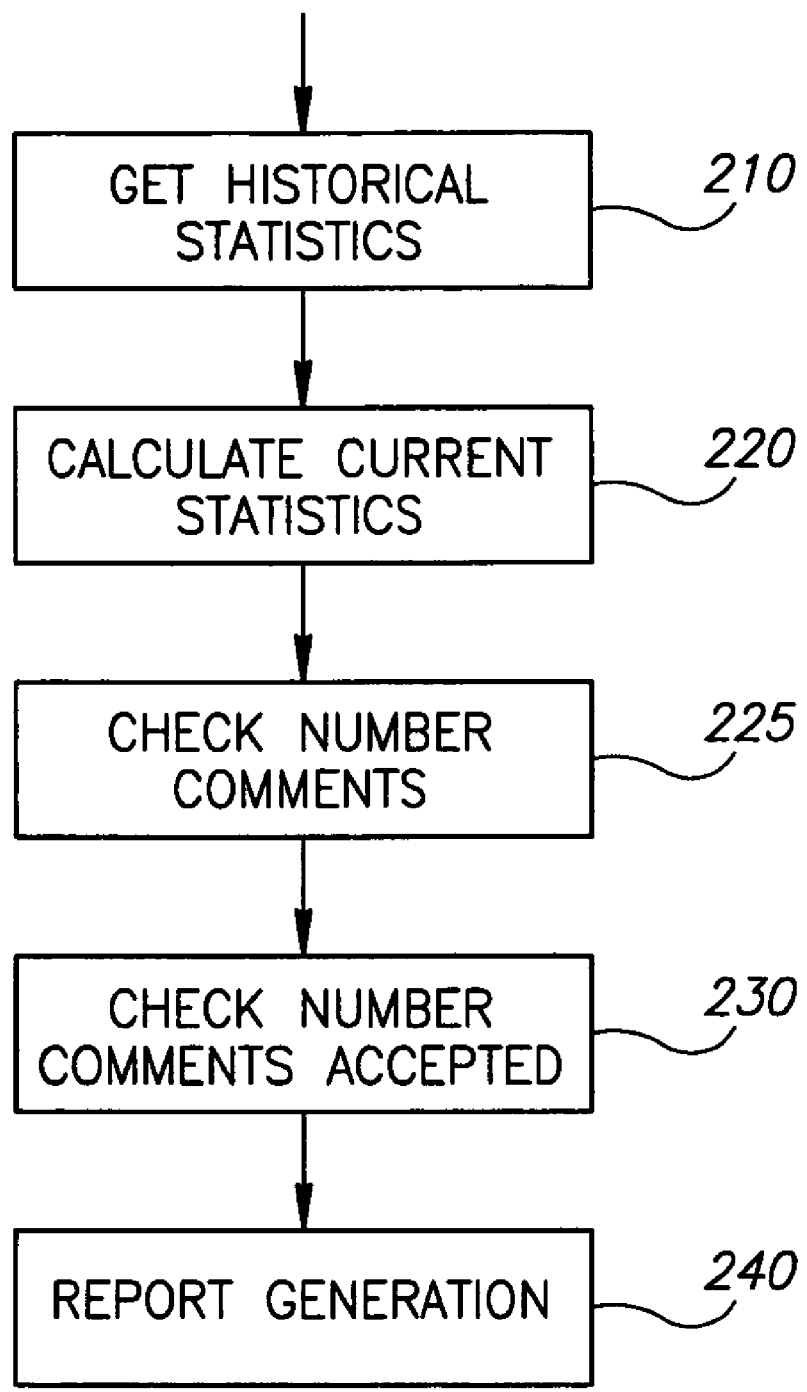
FIG. 3 is a more detailed flow chart illustration of an exemplary embodiment of the report generation block of FIG. 2, in accordance with an embodiment of the present invention.

Reference is now made to FIG. 3, a more detailed flow chart illustration of the exemplary generation of a quality report (block 135 of FIG. 2), in accordance with an embodiment of the present invention. In monitoring overall quality of a project, an evaluation report may be used. It may further be necessary to determine if the exit criteria have been met for this project portion. Historical statistics may be accessed (block 210). Statistics on current input may be calculated from the generated remark block(s) (block 220). The number of remarks generated on the current input may be compared to the expected number based on the historical statistics (block 225). The number of remarks accepted may be compared to the expected acceptance (block 230). If predetermined thresholds are not conformed to, a report may be generated (block 240). In addition, a recommendation may be included, for example, that this input should be inspected by another user. If all thresholds are conformed to, a report may be generated indicating that the exit criteria have been passed (block 240). Such a report may be used, for example, for ISO documentation.

In an embodiment of the present invention, a report may be generated describing the types of remarks generated. Over time, such reports may be used to ascertain concepts or areas in which the writer or designer lacks knowledge and/or skill. If on a given input, more than a predetermined number of remarks related to a specific type of error occur, a learning area may be implied. Likewise, if more than a predetermined number of remarks related to a specific type of error are accepted a learning area may be implied. In code, errors remarked upon may comprise, for example, any of concurrency, nominal path, off-nominal path, standards, and input/output. If for example, 50 out of 100 remarks relate to concurrency issues, the user may be lacking knowledge in this area and may need to learn more about it.

Figure 4:
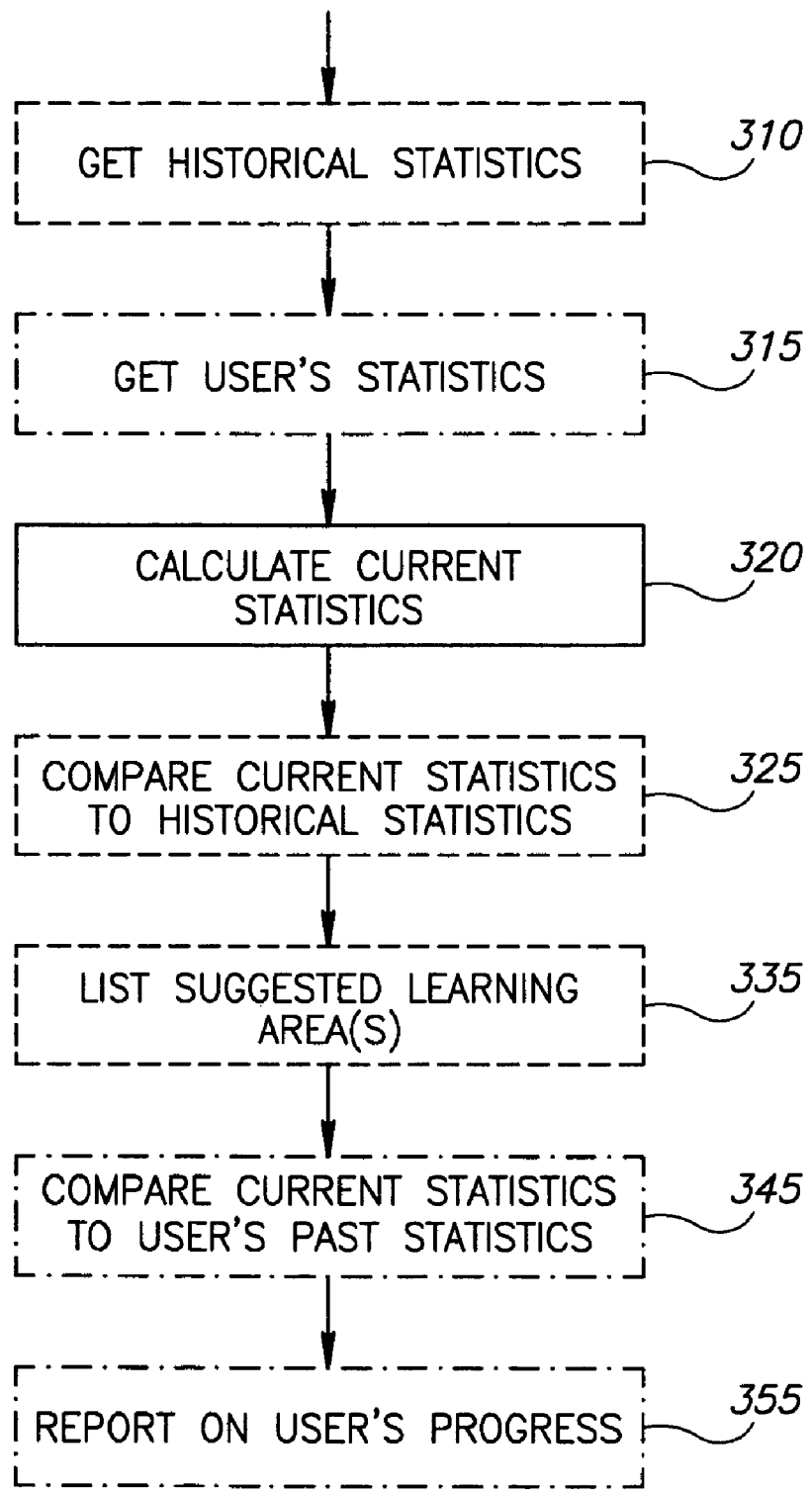
FIG. 4 is a more detailed flow chart illustration of an exemplary embodiment of the report generation block of FIG. 2, in accordance with an embodiment of the present invention.

Reference is now made to FIG. 4, a more detailed flow chart illustration of the exemplary generation of a learning report (block 135 of FIG. 2), in accordance with an embodiment of the present invention. Historical statistics may optionally be accessed (block 310). A record of the user's statistics may optionally be accessed (block 315). Statistics on the current input may be calculated from the generated remark block(s) (block 320).

If historical statistics were accessed, the current statistics may be compared to the historical statistics (block 325). A report of suggested learning areas may be generated (block 335). If the user's statistics were accessed, the current statistics may be compared to the user's past statistics (block 345). A report of the user's progress in specific learning areas may be generated (block 355). Either or both of these learning reports may be generated for any given input.

It is noted that FIGS. 3 and 4 are exemplary report types. Other reports may be generated and are within the scope of the present invention. Similar methods may be used in the generation and will be obvious to those of ordinary skill in the art.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A computer-implemented method, comprising:
   automatically processing software code in an automatic inspection engine so as to create comments that are associated with respective lines of the code and comprise paraphrasing of the code in the respective lines, including multiple comments comprising instances of intentionally incorrect paraphrasing;
   displaying the comments together with the respective lines of the code using a display engine for inspection and acceptance by a reviewer;
   counting a number of the instances accepted by the reviewer in order to evaluate the reviewer; and
   generating a notification that the inspection is unacceptable responsively to the acceptance of the incorrect paraphrasing by the reviewer.

2. The method according to claim 1, and comprising setting a confidence level responsively to the number of the instances accepted by the reviewer.

3. The method according to claim 2, wherein automatically processing the software code comprises generating at least some of the comments responsively to the confidence level.

4. The method according to claim 1, wherein at least some of the comments comprise a response block, for entry therein of a response by the reviewer.

5. The method according to claim 4, wherein the at least some of the comments comprise an action block, providing an action to be taken depending upon the response.

6. The method according to claim 5, wherein one or more of the comments comprise correct paraphrasing, and wherein the action comprises replacing a part of the software code with the correct paraphrasing based upon the response by the reviewer to the one or more of the comments.

* * * * *